(12) United States Patent
Kim

(10) Patent No.: US 8,333,676 B2
(45) Date of Patent: Dec. 18, 2012

(54) GEAR TRAIN OF AUTOMATIC TRANSMISSION FOR VEHICLES

(75) Inventor: Woo-Yeol Kim, Gunpo (KR)

(73) Assignee: Hyundai Motor Company, Seoul (KR)

( * ) Notice: Subject to any disclaimer, the term of this patent is extended or adjusted under 35 U.S.C. 154(b) by 167 days.

(21) Appl. No.: 12/914,528

(22) Filed: Oct. 28, 2010

(65) Prior Publication Data

US 2011/0245013 A1 Oct. 6, 2011

(30) Foreign Application Priority Data

Mar. 31, 2010 (KR) .................. 10-2010-0029446

(51) Int. Cl.
*F16H 3/62* (2006.01)
(52) U.S. Cl. ........................ 475/277; 475/282

(58) Field of Classification Search ............. None
See application file for complete search history.

(56) References Cited

U.S. PATENT DOCUMENTS

2009/0017979 A1* 1/2009 Phillips et al. ............ 475/282

* cited by examiner

*Primary Examiner* — David D Le
*Assistant Examiner* — Erin D Bishop
(74) *Attorney, Agent, or Firm* — Morgan, Lewis & Bockius LLP

(57) ABSTRACT

A gear train of an automatic transmission realizes at least ten forward speeds and one reverse speed by combining four simple planetary gear sets with four clutches and two brakes. In addition, three friction elements are operated at each shift-speed. Therefore, the gear train has advantages of simplifying structures of the automatic transmission and improving power delivery performance and fuel economy.

6 Claims, 14 Drawing Sheets

FIG.3

| | C1 | C2 | C3 | C4 | B1 | B2 | gear ratio |
|---|---|---|---|---|---|---|---|
| D1 | ● | | | | ● | ● | 4.452 |
| D2 | | ● | | | ● | ● | 2.690 |
| D3 | ● | ● | | | | ● | 1.881 |
| D4 | ● | ● | | | | ● | 1.604 |
| D5 | ● | | ● | | | ● | 1.412 |
| D6 | ● | | | ● | | ● | 1.246 |
| D7 | ● | | ● | ● | | | 1.000 |
| D8 | ● | | | ● | ● | | 0.818 |
| D9 | | | ● | ● | ● | | 0.663 |
| D10 | | | ● | ● | ● | | 0.604 |
| REV | | | | ● | ● | ● | -3.432 |

● : operated    ○ : operated at coast

D1/D10 = 7.371

GEAR TRAIN OF AUTOMATIC TRANSMISSION FOR VEHICLES

CROSS-REFERENCE TO RELATED APPLICATION

The present application claims priority to Korean Patent Application No. 10-2010-0029446 filed in the Korean Intellectual Property Office on Mar. 31, 2010, the entire contents of which is incorporated herein for all purposes by this reference.

BACKGROUND OF THE INVENTION

1. Field of the Invention

The present invention relates to a gear train of an automatic transmission for vehicles which realizes at least ten forward speeds and one reverse speed by combining four simple planetary gear sets with four clutches and two brakes.

2. Description of Related Art

A typical shift mechanism of an automatic transmission utilizes a combination of a plurality of planetary gear sets. A gear train of such an automatic transmission that includes the plurality of planetary gear sets changes rotational speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

In addition, with the same number of speeds, features of a gear train, such as durability, efficiency in power transmission, and size, substantially depend on the layout of the combined planetary gear sets. Therefore, designs for a combining structure of a gear train are also under continuous investigation.

A manual transmission that has too many speeds causes inconvenience to a driver. Therefore, the advantageous features of having more shift-speeds are more important in an automatic transmission because an automatic transmission automatically controls the shifting operations.

Currently, four-speed and five-speed automatic transmissions are most often found on the market. However, six-speed automatic transmissions have also been realized for enhancement of performance of power transmission and for enhanced fuel mileage of a vehicle. In addition, seven-speed automatic transmissions and eight-speed automatic transmissions have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for vehicles having advantages of simplifying structures of the automatic transmission and improving power delivery performance and fuel economy as a consequence of realizing at least ten forward speeds and one reverse speed by combining four simple planetary gear sets with four clutches and two brakes.

In an aspect of the present invention, the gear train of an automatic transmission for vehicles includes first, second, third, and fourth planetary gear sets respectively having three rotation elements, and a plurality of friction members, wherein a rotation element of the first planetary gear set may be fixedly connected to a rotation element of the second planetary gear set, another rotation element of the second planetary gear set may be fixedly connected to a rotation element of the third planetary gear set, another rotation element of the third planetary gear set may be fixedly connected to a rotation element of the fourth planetary gear set, and another rotation element of the fourth planetary gear set may be fixedly connected to another rotation element of the first planetary gear set such that eight rotation elements may be formed, wherein the eight rotation elements comprises a first rotation element selectively connected to a transmission housing so as to be operated as a selective fixed element, a second rotation element, a third rotation element operated as a final output element, a fourth rotation element selectively connected to the transmission housing so as to be operated as a selective fixed element, a fifth rotation element selectively connected to an input shaft so as to be operated as a selective input element, a sixth rotation element fixedly connected to the input shaft so as to be always operated as an input element, a seventh rotation element selectively connected to the third rotation element, and an eighth rotation element selectively connected to the second rotation element and selectively connected to the fifth rotation element, and wherein the plurality of friction members comprises first, second, third, and fourth clutches selectively connecting a rotation element with the input shaft or other rotation element, and first and second brakes selectively connecting a rotation element with the transmission housing.

The first, second, third, and fourth planetary gear sets may be disposed from an engine in a sequence of the first planetary gear set, the second planetary gear set, the third planetary gear set, and the fourth planetary gear set.

The first planetary gear set may be a single pinion planetary gear set having a first sun gear, a first planet carrier, and a first ring gear as rotation elements thereof, the second planetary gear set may be a single pinion planetary gear set having a second sun gear, a second planet carrier, and a second ring gear as rotation elements thereof, the third planetary gear set may be a double pinion planetary gear set having a third sun gear, a third planet carrier, and a third ring gear as rotation elements thereof, and the fourth planetary gear set may be a single pinion planetary gear set having a fourth sun gear, a fourth planet carrier, and a fourth ring gear as rotation elements thereof.

The first sun gear may be fixedly connected to the second sun gear, the second ring gear may be fixedly connected to the third sun gear, the third planet carrier may be fixedly connected to the fourth sun gear, and the first planet carrier may be fixedly connected to the fourth ring gear such that the first ring gear may be operated as the first rotation element, the first planet carrier and the fourth ring gear may be operated as the second rotation element, the fourth planet carrier may be operated as the third rotation element, the first and second sun gears may be operated as the fourth rotation element, the third planet carrier and the fourth sun gear may be operated as the fifth rotation element, the second planet carrier may be operated as the sixth rotation element, the third ring gear may be operated as the seventh rotation element, and the second ring gear and the third sun gear may be operated as the eighth rotation element.

The first clutch may selectively connect the fifth rotation element to the input shaft, the second clutch may selectively connect the fifth rotation element to the eighth rotation element, the third clutch may selectively connect the second rotation element to the eighth rotation element, the fourth clutch may selectively connect the third rotation element to the seventh rotation element, the first brake may selectively connect the fourth rotation element to the transmission housing, and the second brake may selectively connect the first rotation element to the transmission housing.

The first and second brakes may be disposed at an external circumferential portion of the first planetary gear set, the third clutch may be disposed between the second and third planetary gear sets, the second and fourth clutches may be disposed between the third and fourth planetary gear sets, and the first clutch may be disposed at a rear of the fourth planetary gear set, wherein the first, second, third, and fourth planetary gear sets may be disposed from an engine in a sequence of the first planetary gear set, the second planetary gear set, the third planetary gear set, and the fourth planetary gear set.

The first clutch and the first and second brakes may be operated as a first forward speed, the second clutch and the first and second brakes may be operated at a second forward speed, the first and second clutches and the second brake may be operated at a third forward speed, the second and third clutches and the second brake may be operated at a fourth forward speed, the first and third clutches and the second brake may be operated at a fifth forward speed, the first and fourth clutches and the second brake may be operated at a sixth forward speed, the first, third, and fourth clutches may be operated at a seventh forward speed, the first and fourth clutches and the first brake may be operated at an eighth forward speed, the first and third clutches and the first brake may be operated at a ninth forward speed, the third and fourth clutches and the first brake may be operated at a tenth forward speed, and the fourth clutch and the first and second brakes may be operated at a reverse speed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 is an operational chart for a gear train according to an exemplary embodiment of the present invention.

Figure 1:
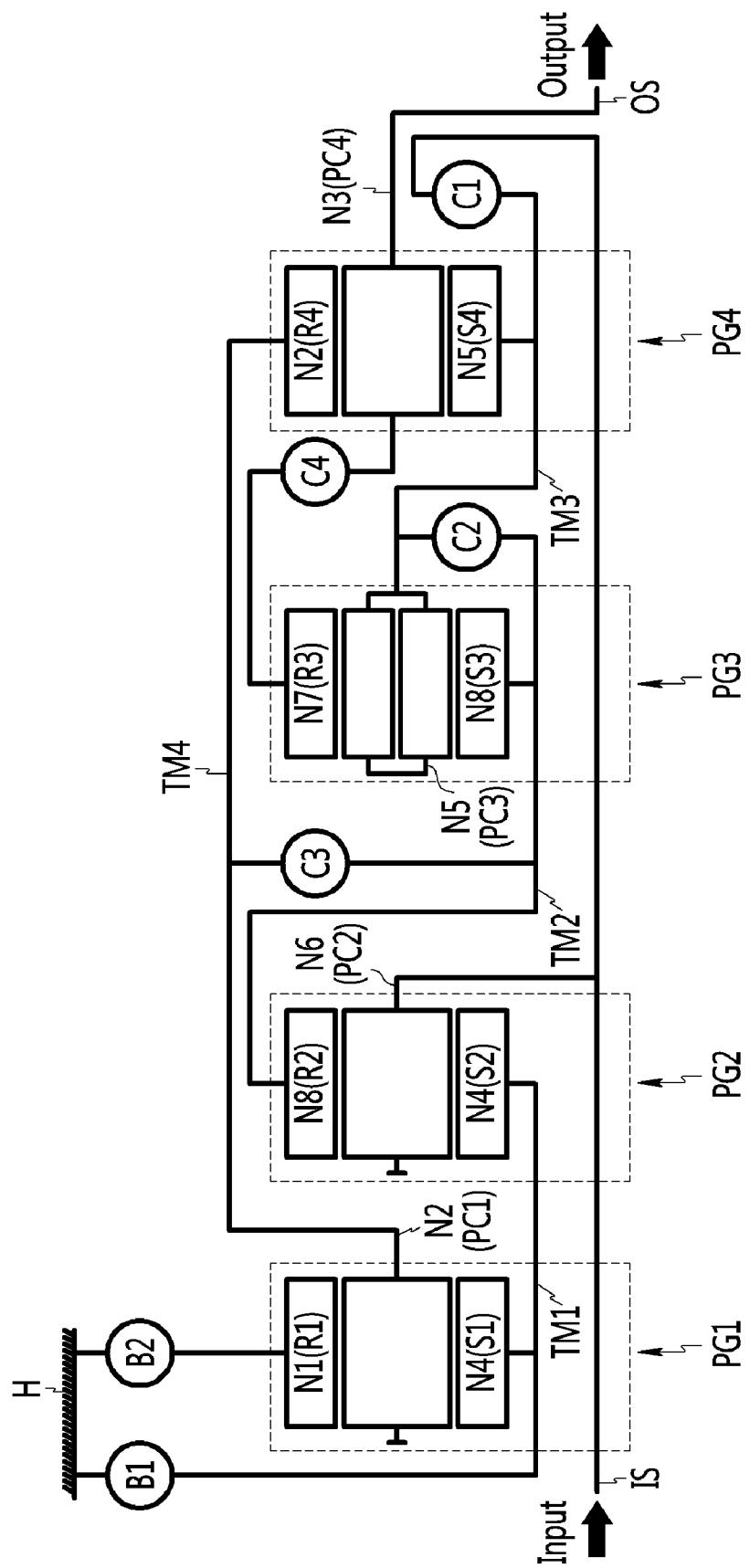
FIG. 1 is a schematic diagram of a gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a gear train according to an exemplary embodiment of the present invention. A gear train according to an exemplary embodiment of the present invention includes first, second, third, and fourth planetary gear sets PG1, PG2, PG3, and PG4 disposed on the same axis, clutch means having four clutches C1, C2, C3, and C4, and brake means having two brakes B1 and B2.

Accordingly, a rotational speed input from an input shaft IS is changed by the first, second, third, and fourth planetary gear sets PG1, PG2, PG3, and PG4 and is output through an output shaft OS. The first planetary gear set PG1 is disposed close to an engine, and the second, third, and fourth planetary gear sets PG2, PG3, and PG4 are sequentially dispose at the back of the first planetary gear set PG1.

The input shaft IS is an input member and denotes a turbine shaft of a torque converter. Torque transmitted from a crankshaft of the engine is converted by the torque converter and is input to the gear train through the input shaft IS. The output shaft OS is an output member and is connected to a well-known differential apparatus (not shown) so as to transmit an output of the gear train to driving wheels.

The first planetary gear set PG1 is a single pinion planetary gear set, and has three rotation elements having a sun gear, a planet carrier, and a ring gear. For better comprehension and ease of description, the sun gear is indicated by a first sun gear S1, the planet carrier is indicated by a first planet carrier PC1, and the ring gear is indicated by a first ring gear R1.

The second planetary gear set PG2 is a single pinion planetary gear set, and has three rotation elements having a sun gear, a planet carrier, and a ring gear. For better comprehension and ease of description, the sun gear is indicated by a second sun gear S2, the planet carrier is indicated by a second planet carrier PC2, and the ring gear is indicated by a second ring gear R2.

The third planetary gear set PG3 is a double pinion planetary gear set, and has three rotation elements having a sun gear, a planet carrier, and a ring gear. For better comprehension and ease of description, the sun gear is indicated by a third sun gear S3, the planet carrier is indicated by a third planet carrier PC3, and the ring gear is indicated by a third ring gear R3.

The fourth planetary gear set PG4 is a single pinion planetary gear set, and has three rotation elements having a sun gear, a planet carrier, and a ring gear. For better comprehension and ease of description, the sun gear is indicated by a fourth sun gear S4, the planet carrier is indicated by a fourth planet carrier PC4, and the ring gear is indicated by a fourth ring gear R4.

Each rotation element of the first, second, third, and fourth planetary gear sets PG1, PG2, PG3, and PG4 is connected such that a rotation element of the first planetary gear set PG1 is connected to a rotation element of the second planetary gear set PG2 through a first power delivery member TM1, another rotation element of the second planetary gear set PG2 is connected to a rotation element of the third planetary gear set PG3 through a second power delivery member TM2, another rotation element of the third planetary gear set PG3 is connected to a rotation element of the fourth planetary gear set PG4 through a third power delivery member TM3, and another rotation element of the fourth planetary gear set PG4 is connected to another rotation element of the first planetary gear set PG1 through a fourth power delivery member TM4. Accordingly, the gear train includes eight rotation elements N1~N8.

Concretely, the first sun gear S1 is fixedly connected to the second sun gear S2, the second ring gear R2 is fixedly connected to the third sun gear S3, the third planet carrier PC3 is fixedly connected to the fourth sun gear S4, and the first planet carrier PC1 is fixedly connected to the fourth ring gear R4.

Figure 2:
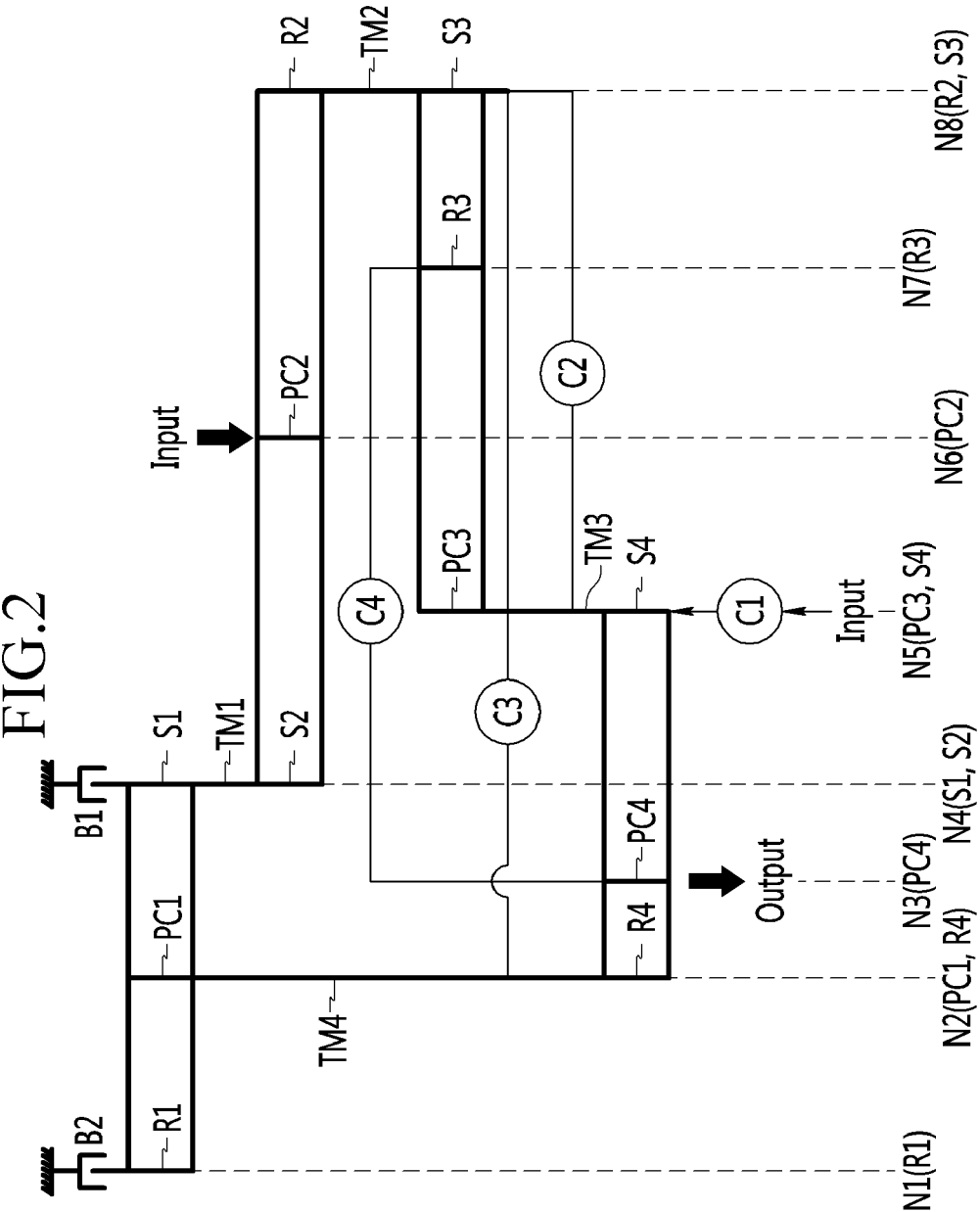
FIG. 2 is a schematic diagram showing connections of constituent element of a gear train according to an exemplary embodiment of the present invention.

Accordingly, the first, second, third, and fourth planetary gear sets PG1, PG2, PG3, and PG4 includes a first rotation element N1 having the first ring gear R1, a second rotation element N2 having the first planet carrier PC1 and the fourth ring gear R4, a third rotation element N3 having the fourth planet carrier PC4, a fourth rotation element N4 having the first and second sun gears S1 and S2, a fifth rotation element N5 having the third planet carrier PC3 and the fourth sun gear S4, a sixth rotation element N6 having the second planet carrier PC2, a seventh rotation element N7 having the third ring gear R3, and an eighth rotation element N8 having the second ring gear R2 and the third sun gear S3, as shown in FIG. 2.

In addition, first, second, third, and fourth clutches C1, C2, C3, and C4 and first and second brakes B1 and B2 are provided so as to selectively connect each rotation element to other rotation element, the input shaft IS, or the output shaft OS.

The first clutch C1 is disposed between the input shaft IS and the fourth sun gear S4 of the fifth rotation element N5 so as to selectively operate the fifth rotation element N5 as an input element.

The second clutch C2 selectively connects the third sun gear S3 of the third planetary gear set PG3 to the third planet carrier PC3 so as to cause the third planetary gear set PG3 to become a direct-coupling state. In this case, the fifth rotation element N5 is directly connected to the eighth rotation element N8.

The third clutch C3 selectively connects the second rotation element N2 to the eighth rotation element N8.

The fourth clutch C4 selectively connects the third rotation element N3 to the seventh rotation element N7.

The first brake B1 selectively connects the first sun gear S1 and the second sun gear S2 forming the fourth rotation element N4 to a transmission housing H such that the fourth rotation element N4 is selectively operated as a fixed element.

The second brake B2 selectively connects the first ring gear R1 forming the first rotation element N1 to the transmission housing H such that the first rotation element N1 is selectively operated as a fixed element.

Friction elements having the first, second, third, and fourth clutches C1, C2, C3, and C4 and the first and second brakes B1 and B2 are conventional multi-plate friction elements of wet type that are operated by hydraulic pressure.

In addition, the first and second brakes B1 and B2 are disposed at an external circumferential portion of the first planetary gear set PG1, the third clutch C3 is disposed between the second and third planetary gear sets PG2 and PG3, the second and fourth clutches C2 and C4 are disposed between the third and fourth planetary gear sets PG3 and PG4, and the first clutch C1 is disposed at a rear of the fourth planetary gear set PG4.

If the friction elements are dispersed as described above, formation of hydraulic lines for supplying hydraulic pressure to such friction elements may be simplified, and weight balance in the automatic transmission may be enhanced.

FIG. 3 is an operational chart for a gear train according to an exemplary embodiment of the present invention. That is, FIG. 3 shows which clutches and brakes are operated at each shift-speed. As shown in FIG. 3, three friction elements are operated at each shift-speed according to an exemplary embodiment of the present invention.

That is, the first clutch C1 and the first and second brakes B1 and B2 are operated at a first forward speed D1, the second clutch C2 and the first and second brakes B1 and B2 are operated at a second forward speed D2, the first and second clutches C1 and C2 and the second brake B2 are operated at a third forward speed D3, the second and third clutches C2 and C3 and the second brake B2 are operated at a fourth forward speed D4, the first and third clutches C1 and C3 and the second brake B2 are operated at a fifth forward speed D5, the first and fourth clutches C1 and C4 and the second brake B2 are operated at a sixth forward speed D6, the first, third, and fourth clutches C1, C3, and C4 are operated at a seventh forward speed D7, the first and fourth clutches C1 and C4 and the first brake B1 are operated at an eighth forward speed D8, the first and third clutches C1 and C3 and the first brake B1 are operated at a ninth forward speed D9, the third and fourth clutches C3 and C4 and the first brake B1 are operated at a tenth forward speed D10, and the fourth clutch C4 and the first and second brakes B1 and B2 are operated at a reverse speed REV.

FIG. 4 to FIG. 14 are lever diagrams for a gear train according to an exemplary embodiment of the present invention. In the drawings, a lower horizontal line represents a rotational speed is "0", and an upper horizontal line represents a rotational speed is "1.0", that is, the rotational speed thereof is the same as that of the input shaft IS.

Eight vertical lines in the drawings sequentially represent the first rotation element N1 to the eighth rotation element N8 from the left to the right, and distances therebetween are set according to gear ratios (teeth number of the sun gear/teeth number of the ring gear) of the first, second, third, and fourth planetary gear sets PG1, PG2, PG3, and PG4.

Position of each rotation element in the lever diagram is well known to a person of an ordinary skill in the art who designs a gear train, and thus detailed description will be omitted.

[First Forward Speed]

At the first forward speed D1, the first clutch C1 and the first and second brakes B1 and B2 are operated, as shown in FIG. 3.

Figure 4:
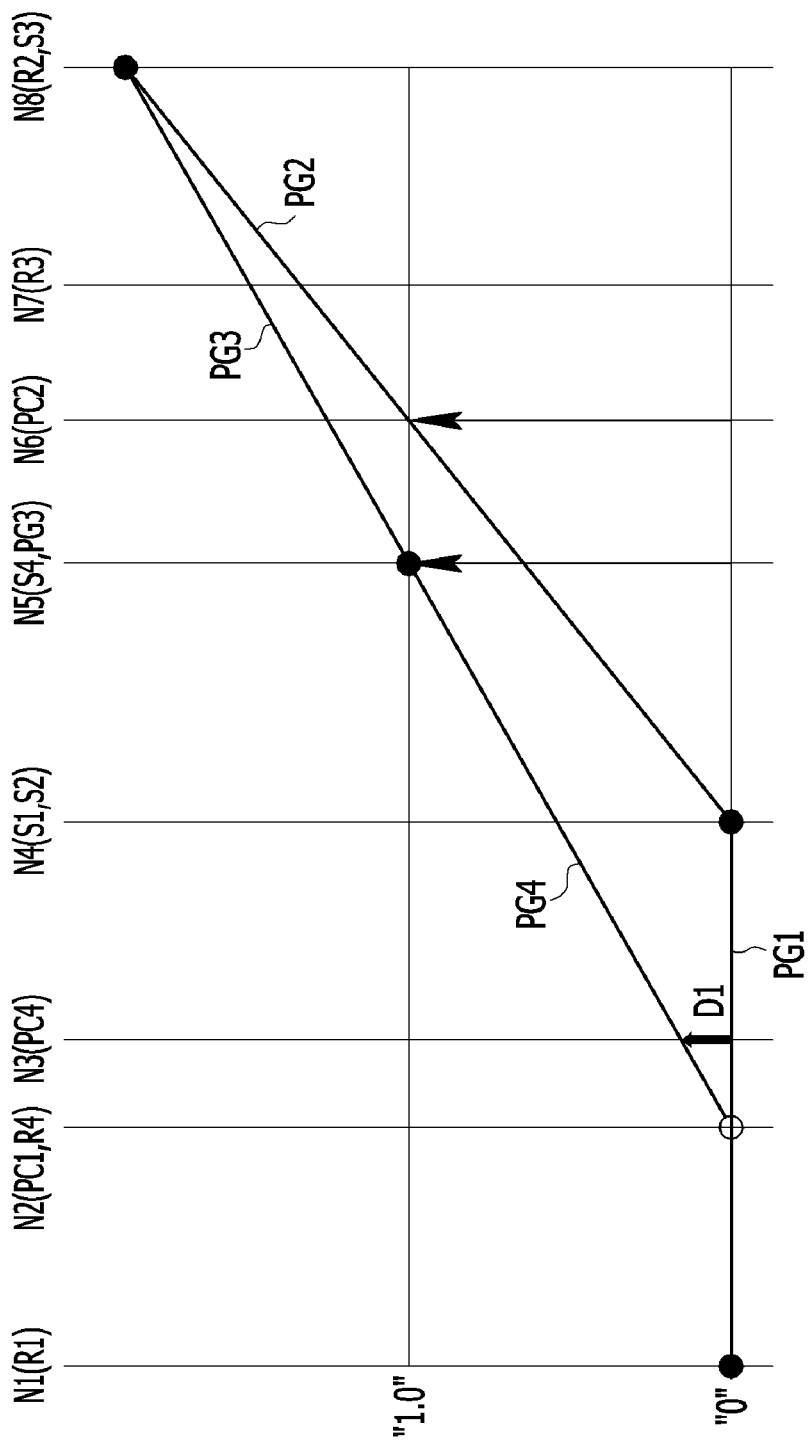
FIG. 4 is a lever diagram for a gear train according to an exemplary embodiment of the present invention at the first forward speed.

In this case, the rotational speed of the input shaft IS is input to the fifth rotation element N5 and the sixth rotation element N6, and all rotation elements of the first planetary gear set PG1 is stopped by operations of the first and second brakes B1 and B2, as shown in FIG. 4.

In a state that the rotational speed of the input shaft IS is input to the fifth rotation element N5 and the sixth rotation element N6, the first rotation element N1 and the fourth rotation element N4 are operated as fixed elements. Therefore, the rotation elements of the first, second, third, and fourth planetary gear sets PG1, PG2, PG3, and PG4 form a shift line shown in FIG. 4, and the first forward speed D1 is output through the third rotation element N3 that is the output element.

[Second Forward Speed]

At the second forward speed D2, the first clutch C1 that was operated at the first forward speed D1 is released and the second clutch C2 is operated, as shown in FIG. 3.

Figure 5:
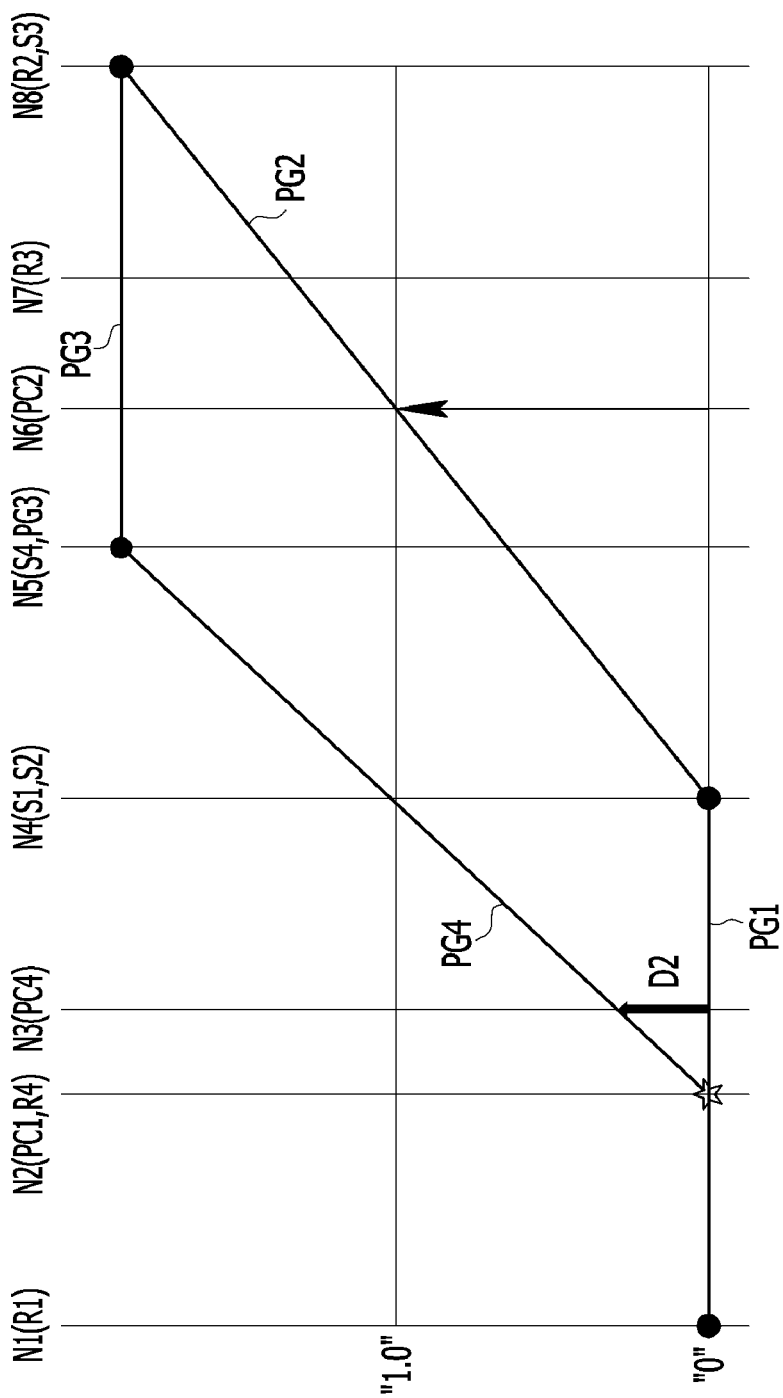
FIG. 5 is a lever diagram for a gear train according to an exemplary embodiment of the present invention at the second forward speed.
Figure 6:
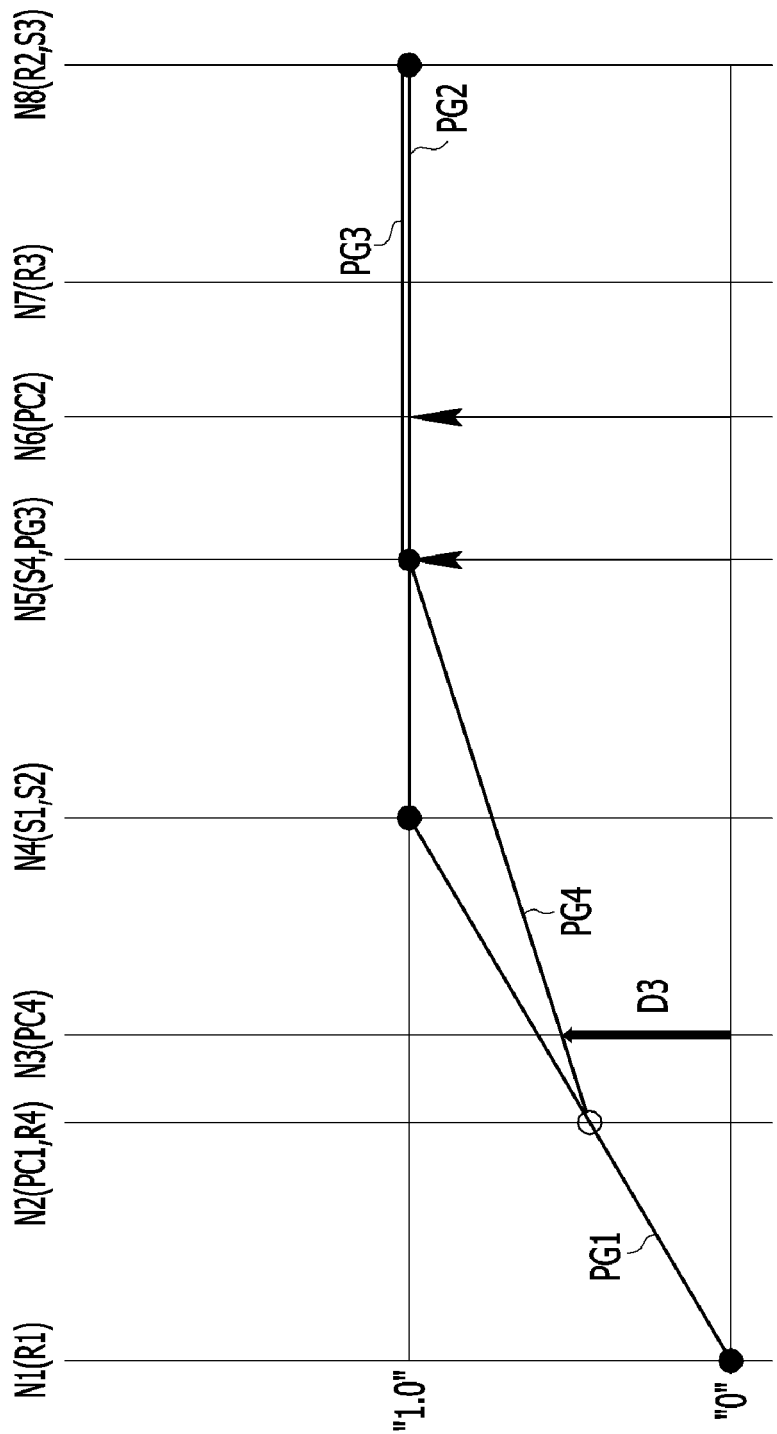
FIG. 6 is a lever diagram for a gear train according to an exemplary embodiment of the present invention at the third forward speed.

In this case, all rotation elements of the first planetary gear set PG1 are stopped and the third planetary gear set PG3 becomes the direct-coupling state by an operation of the second clutch C2, as shown in FIG. 5. In this state, the rotational speed of the input shaft IS is input to the sixth rotation element N6. Therefore, the rotation elements of the first, second, third, and fourth planetary gear sets PG1, PG2, PG3, and PG4 form a shift line shown in FIG. 5, and the second forward speed D2 is output through the third rotation element N3 that is the output element.

[Third Forward Speed]

At the third forward speed D3, the first brake B1 that was operated at the second forward speed D2 is released and the first clutch C1 is operated, as shown in FIG. 3.

In this case, the rotational speed of the input shaft IS is input to the fifth and sixth rotation elements N5 and N6, and the second and third planetary gear sets PG2 and PG3 become the direct-coupling state by the operation of the second clutch C2. Therefore, the rotation elements of the first, second, third, and fourth planetary gear sets PG1, PG2, PG3, and PG4 form a shift line shown in FIG. 6, and the third forward speed D3 is output through the third rotation element N3 that is the output element.

[Fourth Forward Speed]

At the fourth forward speed D4, the first clutch C1 that was operated at the third forward speed D3 is released and the third clutch C3 is operated, as shown in FIG. 3.

Figure 7:
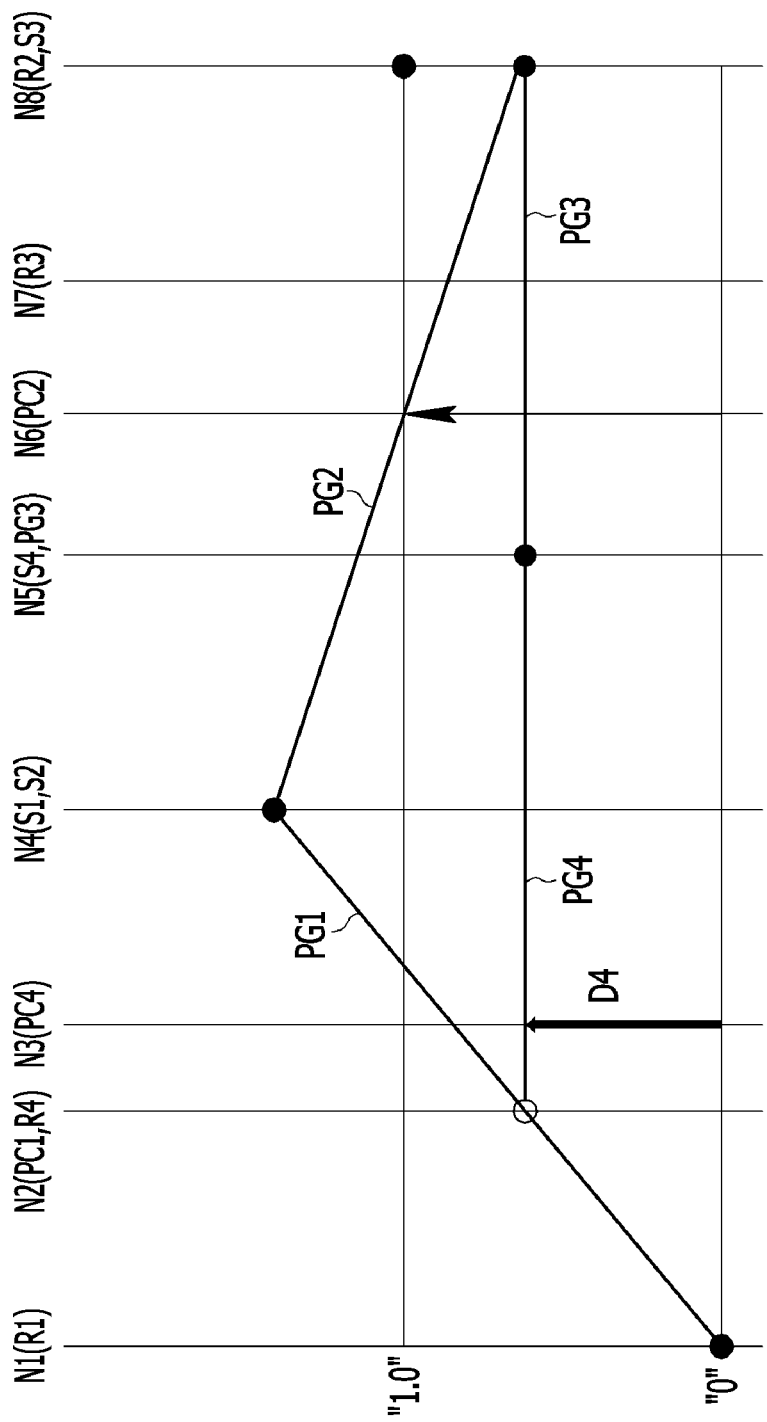
FIG. 7 is a lever diagram for a gear train according to an exemplary embodiment of the present invention at the fourth forward speed.

In this case, the second and third clutches C2 and C3 are simultaneously operated such that the third and fourth planetary gear sets PG3 and PG4 become the direct-coupling state, and the rotational speed of the input shaft IS is input to the sixth rotation element N6, as shown in FIG. 7.

Therefore, the rotation elements of the first, second, third, and fourth planetary gear sets PG1, PG2, PG3, and PG4 form a shift line shown in FIG. 7, and the fourth forward speed D4 is output through the third rotation element N3 that is the output element.

[Fifth Forward Speed]

At the fifth forward speed D5, the second clutch C2 that was operated at the fourth forward speed D4 is released and the first clutch C1 is operated, as shown in FIG. 3.

Figure 8:
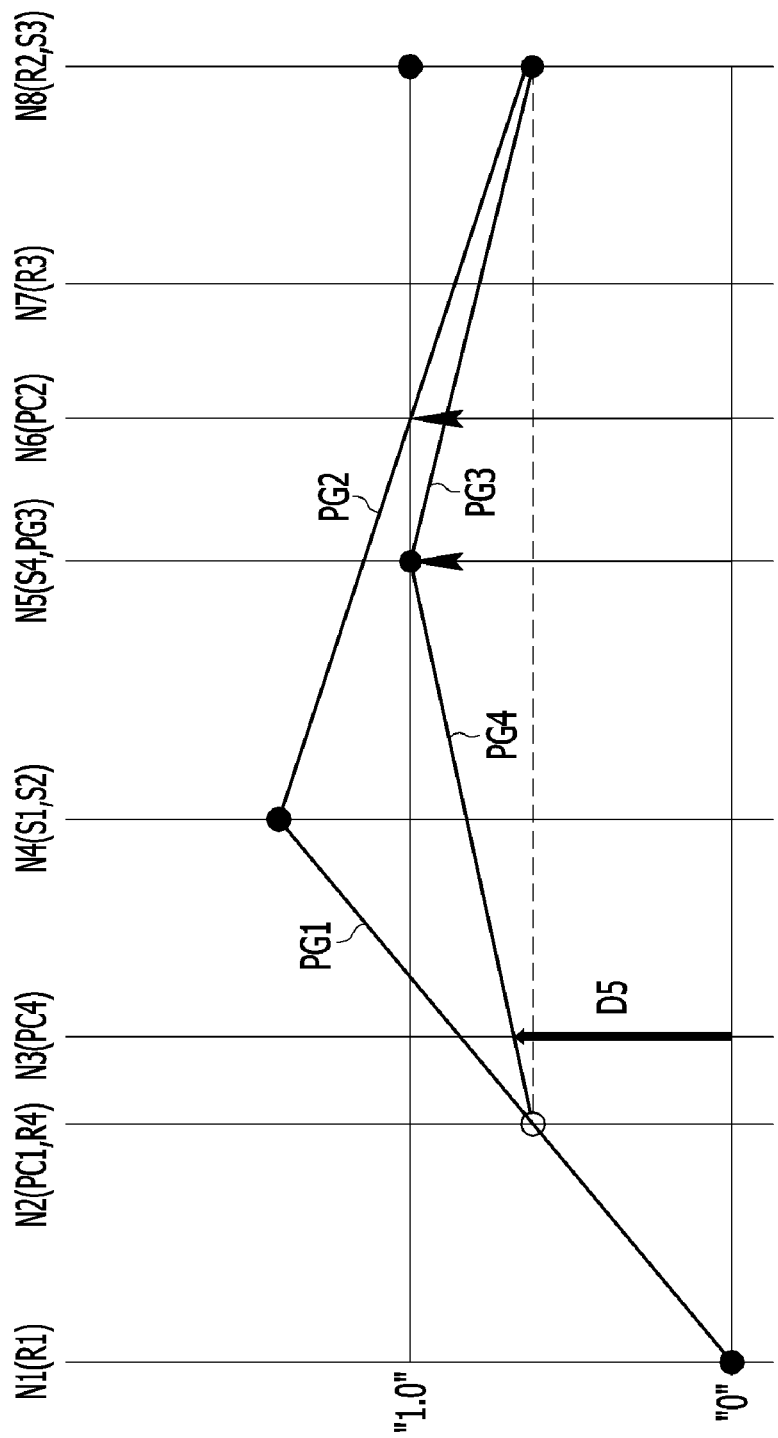
FIG. 8 is a lever diagram for a gear train according to an exemplary embodiment of the present invention at the fifth forward speed.

In this case, the rotational speed of the input shaft IS is input to the fifth and sixth rotation elements N5 and N6 by the operation of the first clutch C1, and the second rotation element N2 is connected to the eighth rotation element N8 by an operation of the third clutch C3, as shown in FIG. 8.

Therefore, the rotation elements of the first, second, third, and fourth planetary gear sets PG1, PG2, PG3, and PG4 form a shift line shown in FIG. 8, and the fifth forward speed D5 is output through the third rotation element N3 that is the output element.

[Sixth Forward Speed]

At the sixth forward speed D6, the third clutch C3 that was operated at the fifth forward speed D5 is released and the fourth clutch C4 is operated, as shown in FIG. 3.

Figure 9:
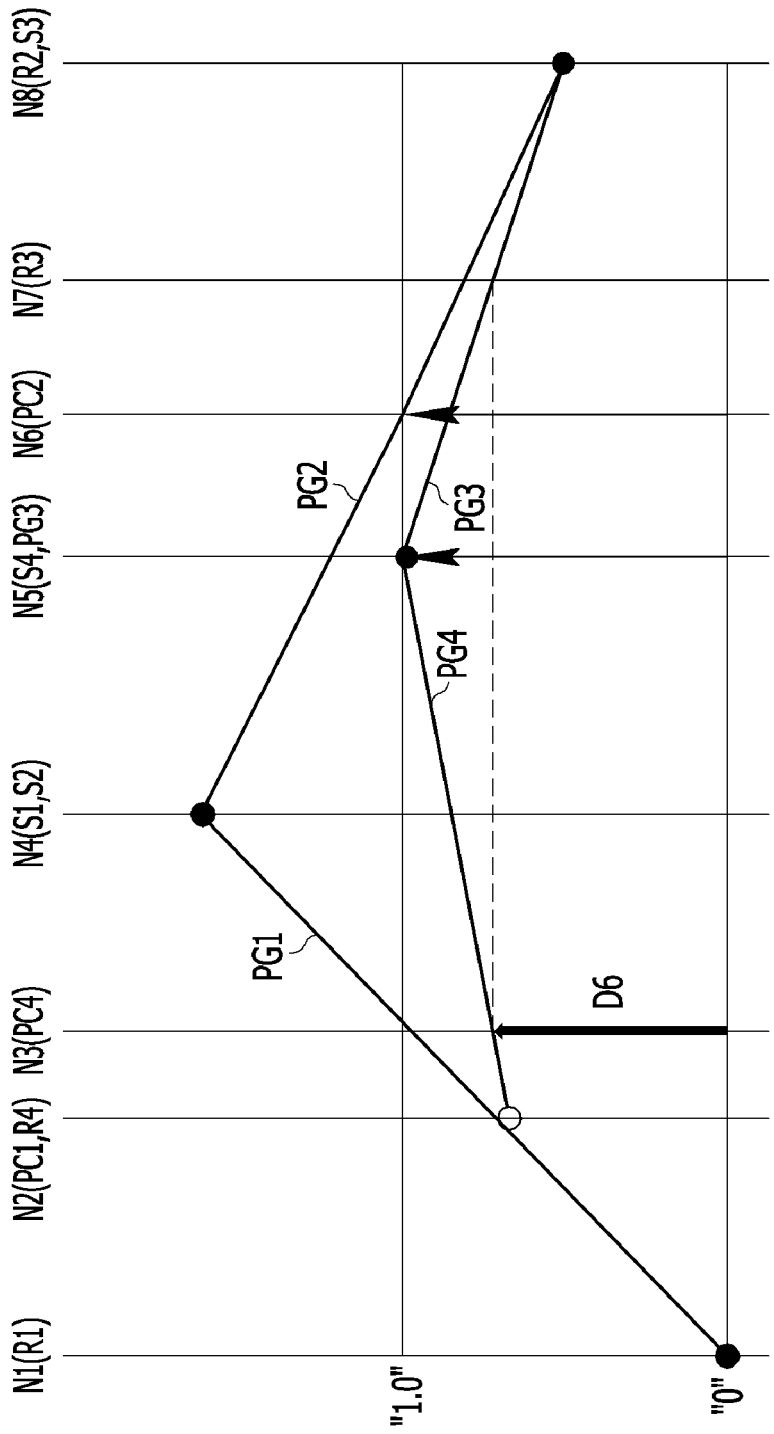
FIG. 9 is a lever diagram for a gear train according to an exemplary embodiment of the present invention at the sixth forward speed.

In this case, the rotational speed of the input shaft IS is input to the fifth and sixth rotation elements N5 and N6 by the operation of the first clutch C1, and the third rotation element N3 is connected to the seventh rotation element N7 by an operation of the fourth clutch C4, as shown in FIG. 9.

Therefore, the rotation elements of the first, second, third, and fourth planetary gear sets PG1, PG2, PG3, and PG4 form a shift line shown in FIG. 9, and the sixth forward speed D6 is output through the third rotation element N3 that is the output element.

[Seventh Forward Speed]

At the seventh forward speed D7, the second brake B2 that was operated at the sixth forward speed D6 is released and the third clutch C3 is operated, as shown in FIG. 3.

Figure 10:
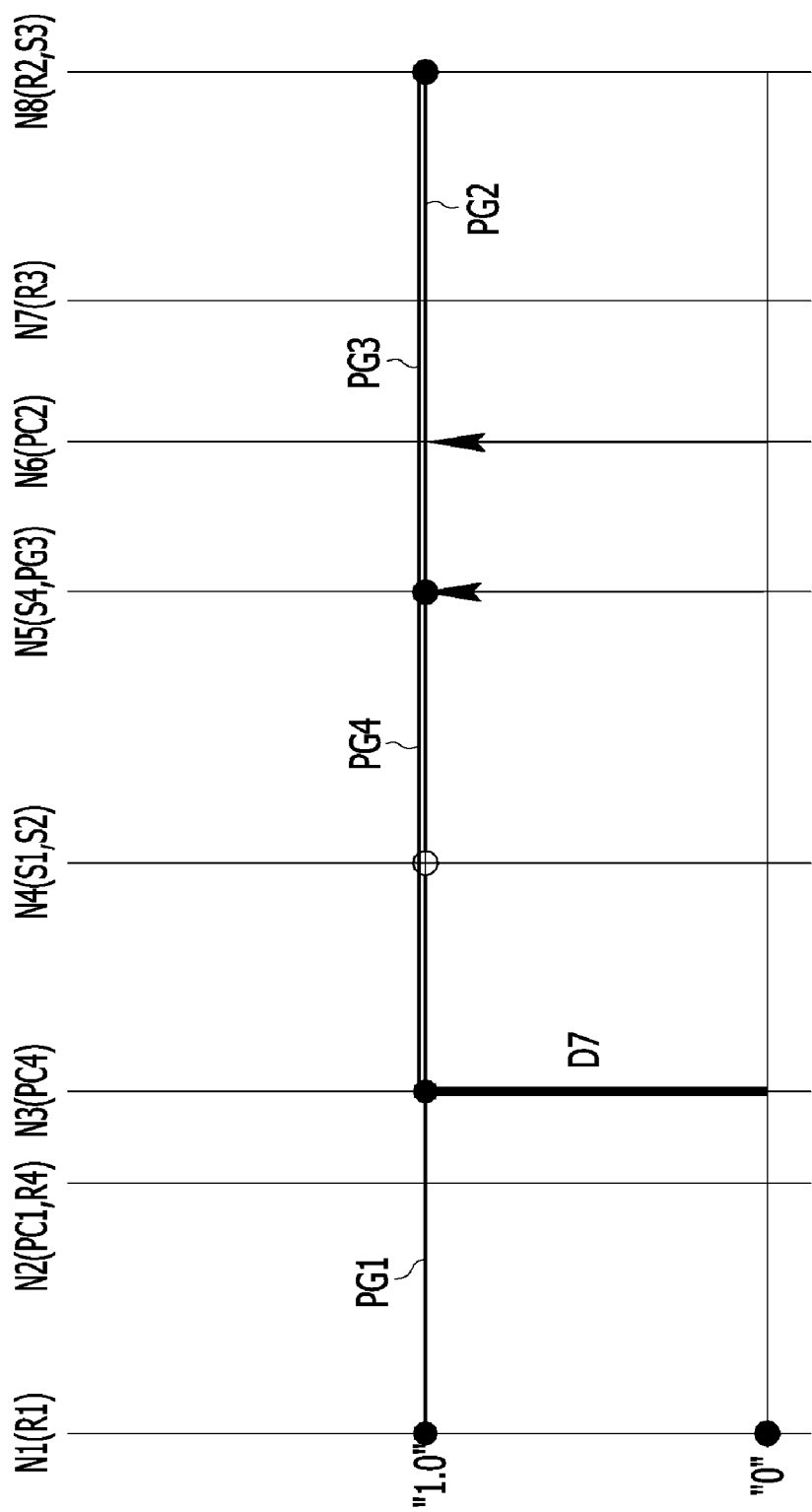
FIG. 10 is a lever diagram for a gear train according to an exemplary embodiment of the present invention at the seventh forward speed.

In this case, the first, second, third, and fourth planetary gear sets PG1, PG2, PG3, and PG4 become the direct-coupling state by the operations of the third and fourth clutches C3 and C4, and the rotational speed of the input shaft IS is input to the fifth and sixth rotation elements N5 and N6, as shown in FIG. 10. Therefore, the rotation elements of the first, second, third, and fourth planetary gear sets PG1, PG2, PG3, and PG4 form a shift line shown in FIG. 10, and the seventh forward speed D7 is output through the third rotation element N3 that is the output element. The rotational speed of the seventh forward speed D7 is the same as that of the input shaft IS.

[Eighth Forward Speed]

At the eighth forward speed D8, the third clutch C3 that was operated at the seventh forward speed D7 is released and the first brake B1 is operated, as shown in FIG. 3.

Figure 11:
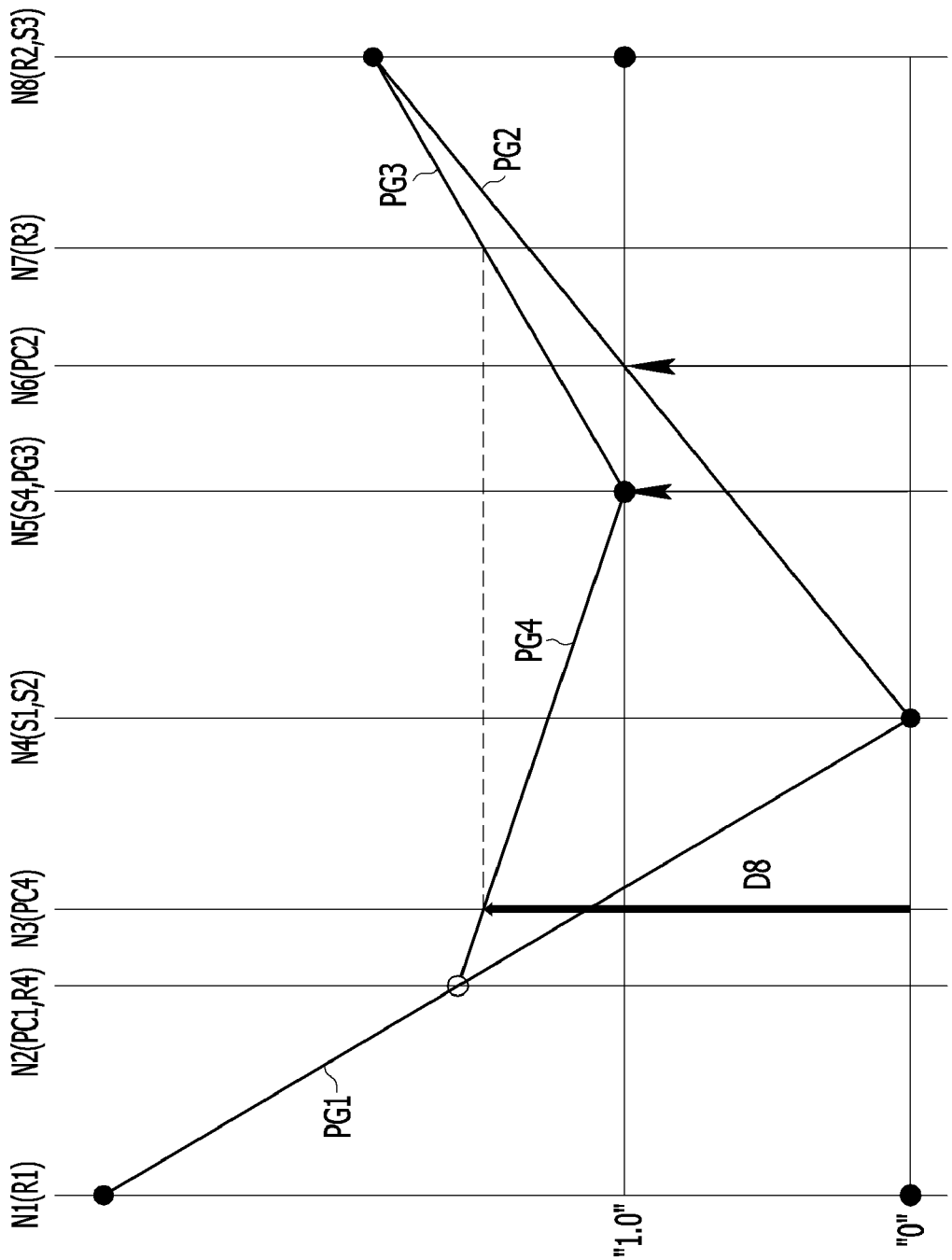
FIG. 11 is a lever diagram for a gear train according to an exemplary embodiment of the present invention at the eighth forward speed.

In this case, the fourth rotation element N4 is operated as the fixed element by an operation of the first brake B1, the rotational speed of the input shaft IS is input to the fifth and sixth rotation elements N5 and N6 by the operation of the first clutch C1, and the third rotation element N3 is connected to the seventh rotation element N7 by the operation of the fourth clutch C4, as shown in FIG. 11.

Therefore, the rotation elements of the first, second, third, and fourth planetary gear sets PG1, PG2, PG3, and PG4 form a shift line shown in FIG. 11, and the eighth forward speed D8 is output through the third rotation element N3 that is the output element.

[Ninth Forward Speed]

At the ninth forward speed D9, the fourth clutch C4 that was operated at the eighth forward speed D8 is released and the third clutch C3 is operated, as shown in FIG. 3.

Figure 12:
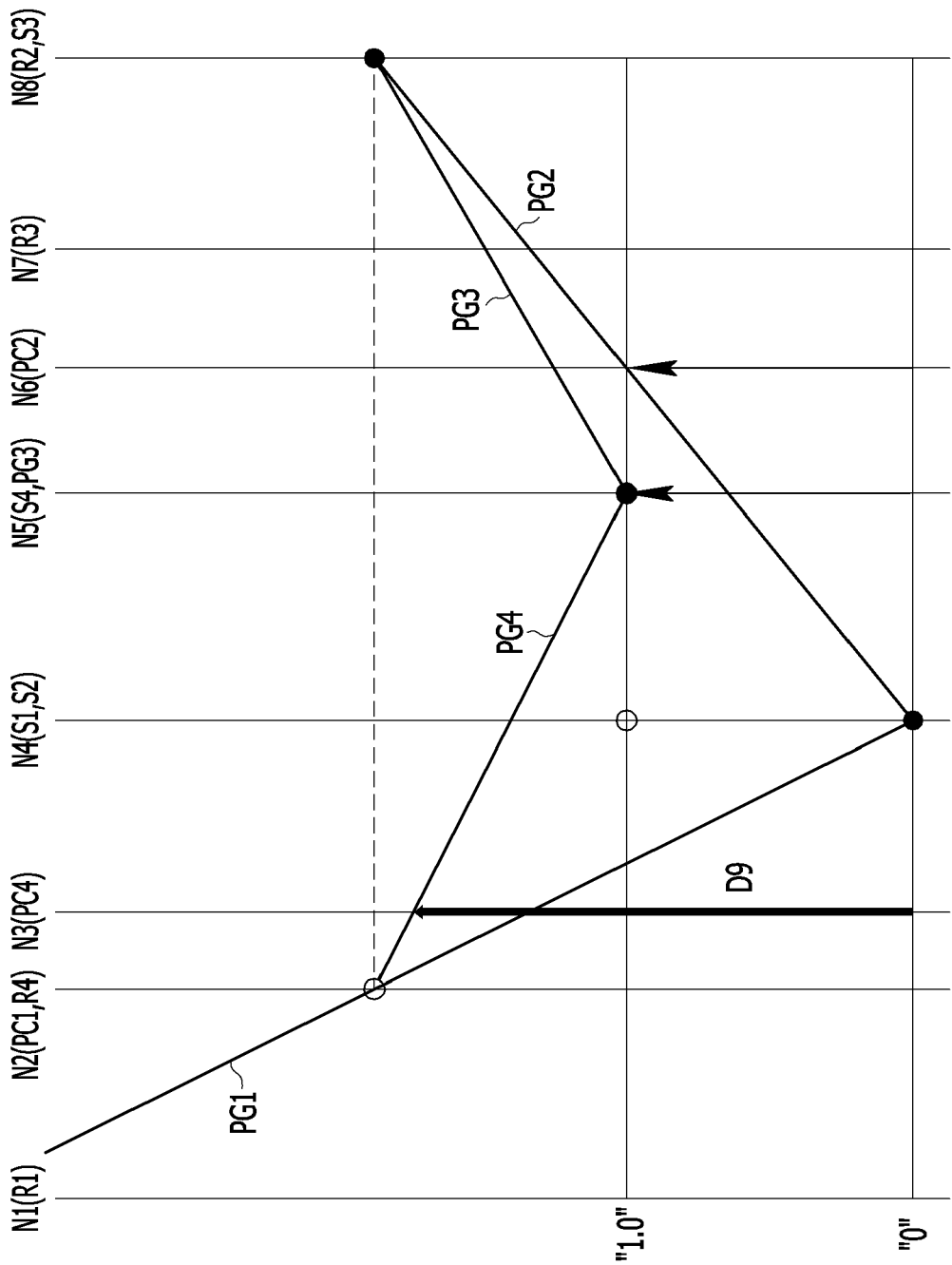
FIG. 12 is a lever diagram for a gear train according to an exemplary embodiment of the present invention at the ninth forward speed.

In this case, the fourth rotation element N4 is operated as the fixed element by the operation of the first brake B1, the rotational speed of the input shaft IS is input to the fifth and sixth rotation elements N5 and N6 by the operation of the first clutch C1, and the second rotation element N2 is connected to the eighth rotation element N8 by the operation of the third clutch C3, as shown in FIG. 12.

Therefore, the rotation elements of the first, second, third, and fourth planetary gear sets PG1, PG2, PG3, and PG4 form a shift line shown in FIG. 12, and the ninth forward speed D9 is output through the third rotation element N3 that is the output element.

[Tenth Forward Speed]

At the tenth forward speed D10, the first clutch C1 that was operated at the ninth forward speed D9 is released and the fourth clutch C4 is operated, as shown in FIG. 3.

Figure 13:
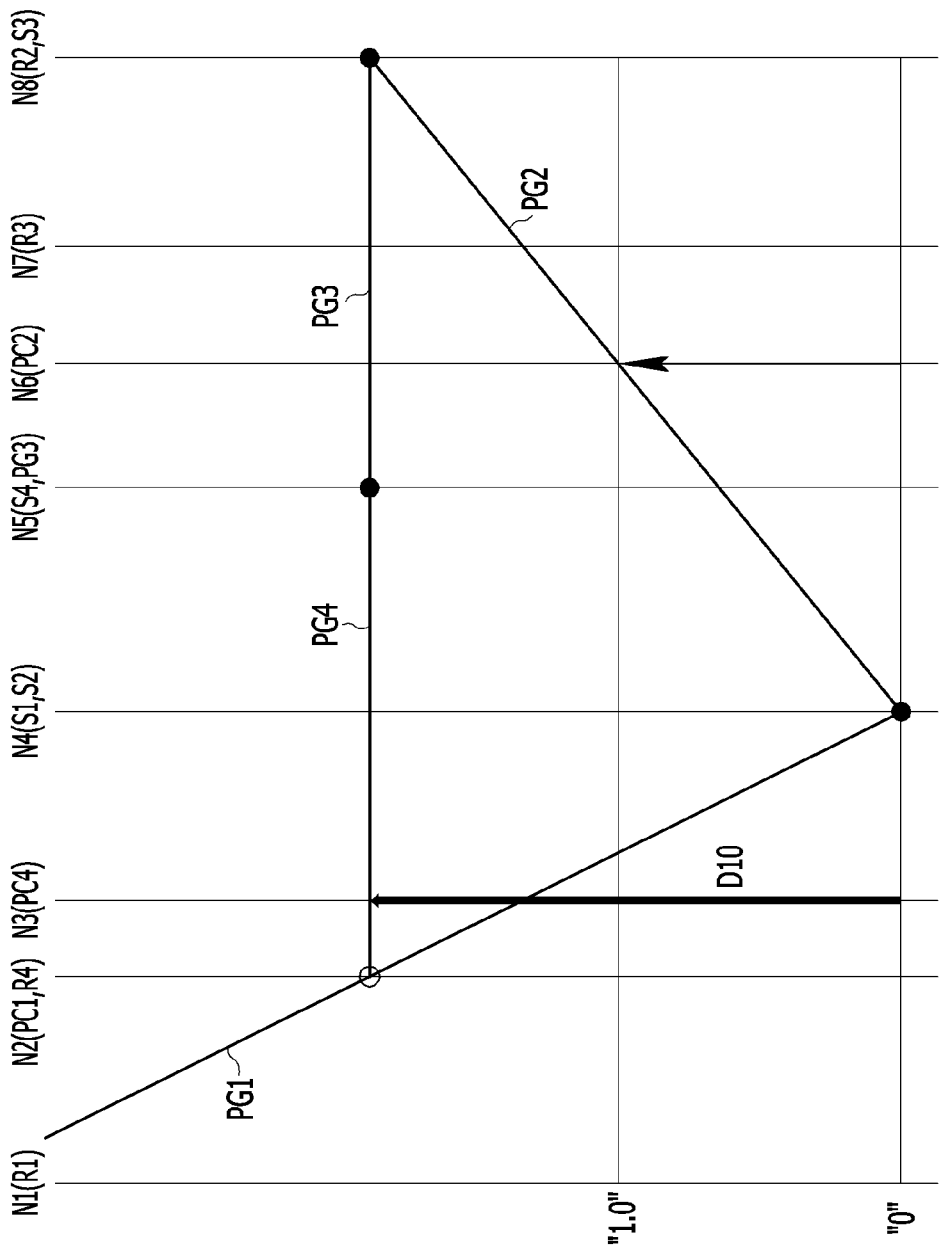
FIG. 13 is a lever diagram for a gear train according to an exemplary embodiment of the present invention at the tenth forward speed.

In this case, the fourth rotation element N4 is operated as the fixed element by the operation of the first brake B1, the rotational speed of the input shaft IS is input to the sixth rotation element N6, and the third and fourth planetary gear sets PG3 and PG4 become the direct-coupling state by the operations of the third clutch C3 and the fourth clutch C4, as shown in FIG. 13.

Therefore, the rotation elements of the first, second, third, and fourth planetary gear sets PG1, PG2, PG3, and PG4 form a shift line shown in FIG. 13, and the tenth forward speed D10 is output through the third rotation element N3 that is the output element.

[Reverse Speed]

At the reverse speed REV, the fourth clutch C4 and the first and second brakes B1 and B2 are operated, as shown in FIG. 3.

Figure 14:
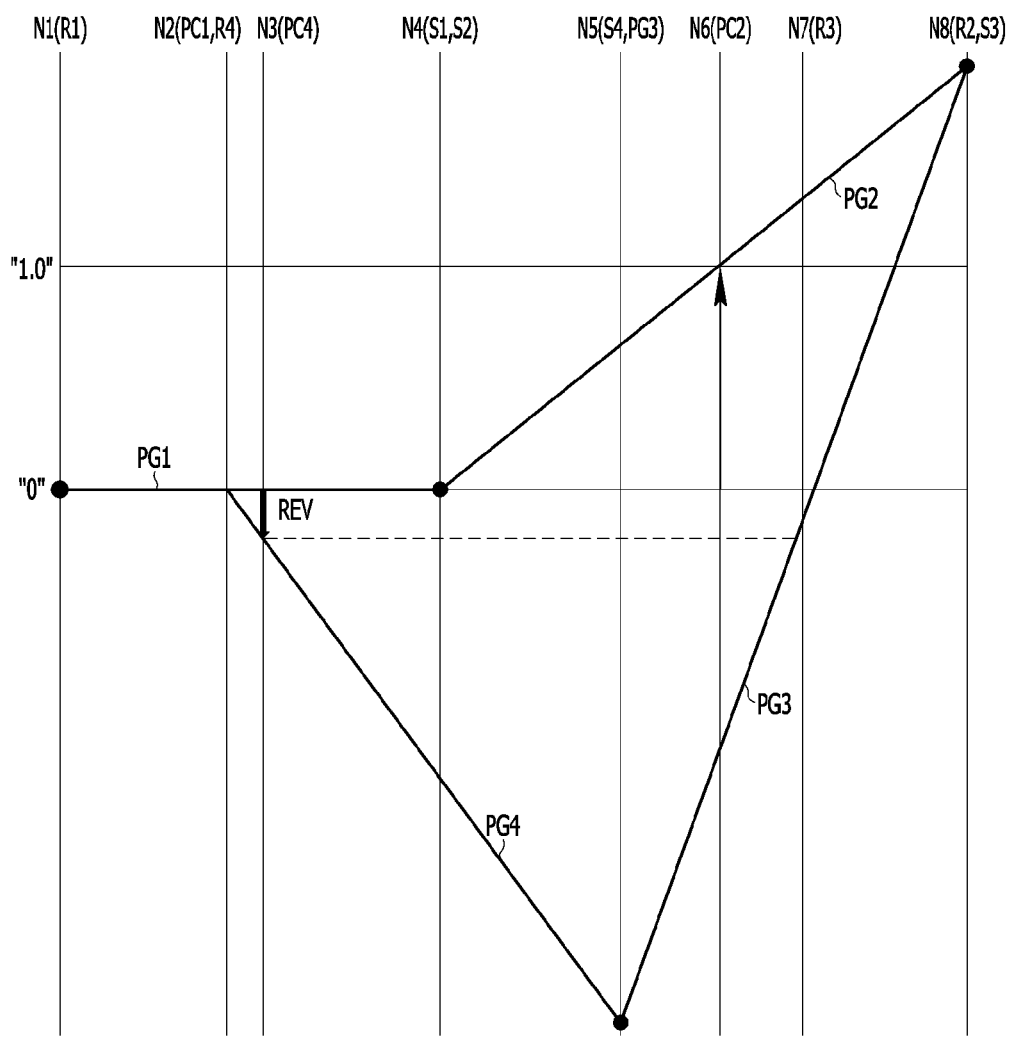
FIG. 14 is a lever diagram for a gear train according to an exemplary embodiment of the present invention at the reverse speed.

In this case, all rotation elements of the first planetary gear set PG1 are stopped by the operations of the first and second brakes B1 and B2, as shown in FIG. 14. In a state that the first rotation element N1 and the fourth rotation element N4 are operated as the fixed elements, the rotational speed of the input shaft IS is input to the sixth rotation element N6, and the third rotation element N3 is connected to the seventh rotation element N7 by the operation of the fourth clutch C4.

Therefore, the rotation elements of the first, second, third, and fourth planetary gear sets PG1, PG2, PG3, and PG4 form a shift line shown in FIG. 14, and the reverse speed REV is output through the third rotation element N3 that is the output element.

As described above, ten forward speeds and one reverse speed are achieved by combining four simple planetary gear sets with four clutches and two brakes. Therefore, power delivery performance and fuel economy may be improved.

Since the frictional elements are dispersedly disposed, formation of hydraulic lines may be simplified, weight balance in an automatic transmission may be enhanced.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for a vehicle, the gear train comprising:
   first, second, third, and fourth planetary gear sets;
   a plurality of friction members; and
   first, second, third, fourth, fifth, sixth, seventh, and eighth rotation elements,
   wherein the first planetary gear set is fixedly connected to the second planetary gear set via the fourth rotation element, the second planetary gear set is fixedly connected to the third planetary gear set via the eighth rotation element, the third planetary gear set is fixedly connected to the fourth planetary gear set via the fifth rotation element, and the fourth planetary gear set is fixedly connected to the first planetary gear set via the second rotation element,
   wherein the first rotation element is selectively connected to a transmission housing so as to be operated as a selective fixed element, the third rotation element is operated as a final output element, the fourth rotation element is selectively connected to the transmission housing so as to be operated as a selective fixed element, the fifth rotation element is selectively connected to an input shaft so as to be operated as a selective input element, the sixth rotation element is fixedly connected to the input shaft so as to be always operated as an input element, the seventh rotation element is selectively connected to the third rotation element, and the eighth rotation element is selectively connected to the second rotation element and selectively connected to the fifth rotation element, and
   wherein the plurality of friction members comprises first, second, third, and fourth clutches and first and second brakes,
   wherein the first planetary gear set is a single pinion planetary gear set having a first sun gear, a first planet carrier, and a first ring gear,
   the second planetary gear set is a single pinion planetary gear set having a second sun gear, a second planet carrier, and a second ring gear,
   the third planetary gear set is a double pinion planetary gear set having a third sun gear, a third planet carrier, and a third ring gear, and
   the fourth planetary gear set is a single pinion planetary gear set having a fourth sun gear, a fourth planet carrier, and a fourth ring gear, and
   wherein the first sun gear is fixedly connected to the second sun gear, the second ring gear is fixedly connected to the third sun gear, the third planet carrier is fixedly connected to the fourth sun gear, and the first planet carrier is fixedly connected to the fourth ring gear such that the first ring gear is operated as the first rotation element, the first planet carrier and the fourth ring gear are operated as the second rotation element, the fourth planet carrier is operated as the third rotation element, the first and second sun gears are operated as the fourth rotation element, the third planet carrier and the fourth sun gear are operated as the fifth rotation element, the second planet carrier is operated as the sixth rotation element, the third ring gear is operated as the seventh rotation element, and the second ring gear and the third sun gear are operated as the eighth rotation element.

2. The gear train of claim 1, wherein the first, second, third, and fourth planetary gear sets are disposed from an engine in a sequence of the first planetary gear set, the second planetary gear set, the third planetary gear set, and the fourth planetary gear set.

3. The gear train of claim 1, wherein the first clutch selectively connects the fifth rotation element to the input shaft,
the second clutch selectively connects the fifth rotation element to the eighth rotation element,
the third clutch selectively connects the second rotation element to the eighth rotation element,
the fourth clutch selectively connects the third rotation element to the seventh rotation element,
the first brake selectively connects the fourth rotation element to the transmission housing, and
the second brake selectively connects the first rotation element to the transmission housing.

4. The gear train of claim 3, wherein the first and second brakes are disposed at an external circumferential portion of the first planetary gear set, the third clutch is disposed between the second and third planetary gear sets, the second and fourth clutches are disposed between the third and fourth planetary gear sets, and the first clutch is disposed at a rear of the fourth planetary gear set.

5. The gear train of claim 4, wherein the first, second, third, and fourth planetary gear sets are disposed from an engine in a sequence of the first planetary gear set, the second planetary gear set, the third planetary gear set, and the fourth planetary gear set.

6. The gear train of claim 3, wherein the first clutch and the first and second brakes are operated as a first forward speed,
the second clutch and the first and second brakes are operated at a second forward speed,
the first and second clutches and the second brake are operated at a third forward speed,
the second and third clutches and the second brake are operated at a fourth forward speed,
the first and third clutches and the second brake are operated at a fifth forward speed,
the first and fourth clutches and the second brake are operated at a sixth forward speed,
the first, third, and fourth clutches are operated at a seventh forward speed,
the first and fourth clutches and the first brake are operated at an eighth forward speed,
the first and third clutches and the first brake are operated at a ninth forward speed,
the third and fourth clutches and the first brake are operated at a tenth forward speed, and
the fourth clutch and the first and second brakes are operated at a reverse speed.

* * * * *